United States Patent Office 3,516,980
Patented June 23, 1970

3,516,980
HETEROGENEOUS 1:2 COBALT OR CHROMIUM COMPLEX AZO DYESTUFFS
Jacky Dore and Reinhard Neier, Basel, Switzerland, assignors to Sandoz Ltd. (also known as Sandoz A.G.), Basel, Switzerland
No Drawing. Filed Sept. 21, 1966, Ser. No. 580,890
Claims priority, application Switzerland, Oct. 1, 1965, 13,596/65
Int. Cl. C09b 45/16, 45/20
U.S. Cl. 260—145          10 Claims

ABSTRACT OF THE DISCLOSURE

Heterogeneous 1:2 cobalt or chromium complex azo dyes are suitable for the coloration of surface coatings, such as nitrocellulose and vinyl lacquers. They have better fastness to light, washing and milling than the next comparable previously known dyes. Each monoazo dye of the heterogeneous metal complex azo dyes contains two groups capable of metal complex formation; one of the monoazo dyes has directly bound to an azo nitrogen a 6-halo-4-sulfonaphthyl-1, the 2-position of which is bound through an oxygen bridge to the metal, and each other of the monoazo dyes has (a) a ring carbon of a benzene ring directly bound to an azo nitrogen and (b) a carbon ortho to the ring carbon bound to said metal through a bridge selected from the group consisting of an oxygen bridge and a carboxy bridge, any further substituent on the benzene ring being non-water-solubilizing.

---

This invention relates to heterogeneous 1:2 cobalt or chromium complex compounds and a process for their production and for their use. The process consists of reacting with at least one equivalent of a cobalt- or chrominum-yielding agent, either in substance or on the fibre, 2 moles of a mixture of azo dyes which contain 2 groups capable of metal complex formation, one of the dyes of the mixture corresponding to a monoazo compound of the formula:

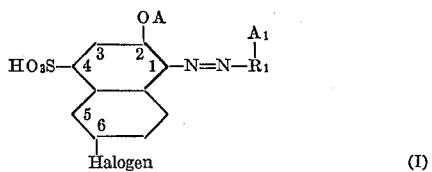

(I)

where:
A represents a hydrogen atom or a lower alkyl radical,
$A_1$ a hydroxyl or amine group or a lower alkoxy group,
$R_1$ the radical of a diazo component or coupling component, and in which substituent $A_1$ is in a position ortho to that of a carbon directly bound to the —N=N-group, and the other azo dye or dyes of the mixture corresponding to a monoazo compound of formula

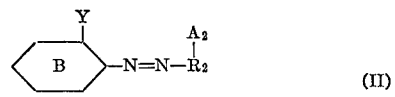

(II)

where:
Y represents a hydroxyl, carboxyl or lower alkoxy group,
$A_2$ a hydroxyl or amino group or a lower alkoxy group,
$R_2$ the radical of any desired coupling component, and in which the substituent $A_2$ is in a position ortho to that of a carbon directly bound to the —N=N-group and the ring B may, but need not, contain further non-water-solubilizing substituents, i.e., it may be otherwise unsubstituted as in Example 3. A further mode of operation of the process is to react with each other 1 mole of a 1:1 chromium complex compound of Formula I and 1 mole of one or more unmetallized monoazo compounds of Formula II.

The preferred heterogeneous 1:2 metal complex compounds have the formula:

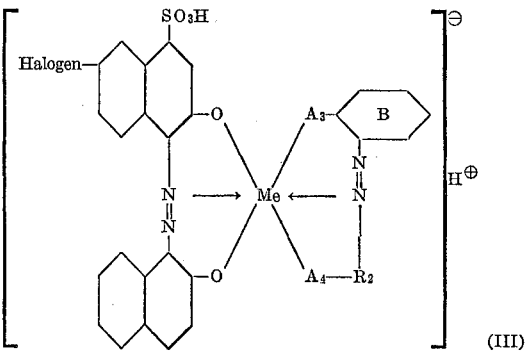

(III)

where:
$A_3$ represents —O— or —COO—,
$A_4$—O—, —NH—, —N— or —N—
                         |          |
                       alkyl      aryl Me chromium or cobalt, and in which the heterogeneous complex contains a —$SO_3H$-group.

The mixing ratio of the one dye of Formula I and the one or more dyes of Formula II may vary within wide limits. In most cases equimolar amounts of the two dye components are metallized with each other, but mixtures containing 0.3 to 1.7 moles of one of the two components of Formulae I and II can be used if desired. Halogen stands mainly for a chlorine atom, though it may represent a bromine or, in rare cases, a fluorine atom.

It is known from German Pat. No. 600,545, in particular from its Examples 14 and 16, that heterogeneous chromium-containing azo dyes can be obtained by reacting chromium-containing azo dyes with azo dyes which contain metal-binding groups and are different from the azo dyes on which the chromium-containing azo dyes are based.

The diazo components enumerated in the examples of the aforecited German patent differ from the diazo components of Formula I used in the present invention in that they contain a hydrogen atom in the 6-position of the naphthalene nucleus. In the process described in this patent the heterogeneous complexes are formed by reacting a metal-free azo dye with a 1:1 chromium complex dye. In French Pat. No. 1,155,804, in particular its Example 1, another process for the production of heterogeneous chromium-containing azo dyes is described. In this a 1:1 chromium complex dye of one of the therestated formulae is reacted with a metal-free azo dye. The diazo components named in the examples and in the claim of this patent differ from the diazo components of Formula I employed in the present invention in that they bear a nitro group in the 6-position of the naphthalene nucleus.

The heterogeneous metal complex dyes obtained by the processes disclosed in the two aforecited patents are used mainly for dyeing or printing wool, silk, leather and synthetic polyamide fibres. The heterogeneous metal complex dyes formed in accordance with the process here disclosed can also be used for dyeing or printing these materials, but at the same time they are equally suitable for the coloration of certain surface coatings, for example nitrocellulose and vinyl lacquers. They have better fastness to light, washing and milling than the next comparable dyes of the named patents.

The process of this invention also permits the production of purer heterogeneous metal complex dyes. It has been found that when the operating instructions of the aforenamed patents are closely followed, a certain amount of the metal-free starting dyes is invariably present in the production of the heterogeneous 1:2 chromium complex dyes.

The lower alkyl or alkoxy radicals used in the present process are preferably alkyl or alkoxy radicals containing 1 to 3 carbon atoms. The amino group may be a primary or secondary amino group, for example an alkylamino or arylamino group. In most cases the aryl radical stands for a phenyl radical, but it can represent if desired a naphthyl radical. The aryl radical may be further substituted, for instance by chlorine, bromine, alkyl, alkoxy, sulphonamide, alkylsulphonyl, etc.

As diazo components it is best to use the diazo components of ortho-carboxyamines or ortho-hydroxyamines of the benzene or naphthalene series, which in addition to the above-defined substituents may contain further substituents, such as nitro groups, halogen atoms (e.g. chlorine, bromine), alkyl groups (e.g. methyl, ethyl), alkoxy groups (e.g. methoxy, ethoxy), etc. The following may be enumerated as examples: 2-amino-1-hydroxy-4- or -5-chlorobenzene, 2-amino-1-hydroxy-4-, -5- or -6-nitrobenzene, 2-amino-1-hydroxy - 4,6 - dichlorobenzene, 2-amino-1-hydroxy-4-methyl-6-nitrobenzene and 1-amino-2-hydroxynaphthalene.

Suitable coupling compounds are those which are capable of coupling in the adjacent position to a primary or secondary amino group or to a hydroxy- or alkoxy group; they are understood to include keto compounds which couple in adjacent position to their enolized or enolizable keto group. The following are examples: hydroxybenzenes, $\beta$-ketocarboxylic acid esters and amides, such as acetoacetic acid anilide and 1-acetoacetylamino-2-, -3- or -4-chlorobenzene, pyrazolones, such as 1-phenyl-3-methyl-5-pyrazolone, aminopyrazoles, hydroxy and aminonaphthalene derivatives, such as 2-aminonaphthalene, 2-phenylaminonaphthalene, 2-hydroxynaphthalene and 1-hydroxynaphthalene.

The reaction giving the cobalt or chromium complex dye is effected with advantage by allowing an amount of a cobalt- or chromium-yielding agent containing less than two but at least one equivalent of cobalt or chromium to act upon 2 moles of the azo compound.

For instance, the heterogeneous cobalt or chromium complexes can be formed with an azo dye of Formula I and one or more azo dyes of Formula II. Alternatively, 1 mole of a 1:1 chromium complex compound of Formula I can be reacted with 1 mole of one or more metal-free monoazo compounds of Formula II.

The reaction is carried out in substance preferably in aqueous, alkaline or organic medium, to which the metal compounds are added in the presence of compounds which maintain the metal dissolved in complex combination in caustic alkaline medium, for example tartaric, citric or lactic acid. The metallizing reaction can also be effected on the fibre.

Examples of suitable cobalt compounds are cobaltous formate, cobaltous acetate and cobaltous sulphate. Suitable chromium compounds are, for example, chromic sulphate, chromic formate, chromic acetate, chromic potassium sulphate and chromic ammonium sulphate. The chromates too, for example sodium or potassium chromate and bichromate, are highly suitable.

The heterogeneous metal complex dyes thus formed can be separated from the aqueous medium by the addition of salt, and are then filtered off, washed if necessary and dried.

The heterogeneous metal complex dyes obtained in substance are well soluble in water and dye wool, silk, leather and synthetic polyamide fibres from neutral or acid dyebath. The dyeings are of blue, violet, brown, red, green or grey shade and have good light fastness and good wet fastness properties, such as fastness to washing, water, sea water, perspiration, carbonizing, bleaching, milling, rubbing, pressing, acids, alkalis, stoving and cross dyeing. They are also well soluble in polar solvents, for example ketones, alcohols, acetic acid alkyl esters and propionic acid alkyl esters, and thus are suitable for the dyeing and printing of leather, for the spin dyeing of fibre-forming materials in solution in organic solvents, and for the pigmentation of plastics, synthetic resins and surface coatings in blue, violet, brown, red, green and grey shades, which also have good light and wet fastness properties, together with good resistance to heat, fats, gas fumes and, in the case of surface coatings, to top finishes.

In the following examples the parts and percentages are by weight and the temperatures in degrees centigrade.

EXAMPLE 1

In 500 parts of water 9.2 parts of the monoazo compound obtained by coupling diazotized 1-amino-2-hydroxy-6-bromonaphthalene-4-sulphonic acid with 2-hydroxynaphthalene and 6.8 parts of the monoazo compound obtained by coupling diazotized 2-amino-1-hydroxy-4-nitrobenzene with 1-phenyl-3-methyl-5-pyrazolone are dissolved at 80° with the addition of 8 parts of sodium hydroxide. A solution of 5.6 parts of crystallized cobaltous sulphate and 1.5 parts of tartaric acid in 80 parts of water is added and the combined solution is stirred at 80° until the metal-free starting dyes are no longer indicated. The reaction product is precipitated with sodium chloride, filtered off, dried and ground. It is a dark powder which dissolves in water to give brown solutions and dyes wool, silk, leather and polyamide fibres, e.g. synthetic polyamide fibres, in brown shades of excellent light fastness.

EXAMPLE 2

9.2 parts of the monazo compound obtained by coupling diazotized 1-amino-2-hydroxy-6-bromonaphthalene-4-sulphonic acid with 2-hydroxynaphthalene are stirred in 50 parts of ethylene glycol. After the addition of 10 parts of chromic ammonium sulphate [$NH_4Cr(SO_4)_2.12H_2O$] the temperature is increased to 130°. After a few hours at this temperature the metal-free dye is no longer indicated. On cooling to 100° a solution of 6.8 parts of the monoazo compound obtained by coupling diazotized 2-amino-1-hydroxy-4-nitrobenzene with 1-phenyl-3-methyl-5-pyrazolone in 30 parts of formamide is added and stirring is continued for 1 hour at 100°. After this time no further metal-free starting dye is indicated in the reaction mixture. 200 parts of water and 40 parts of sodium chloride are added, on which the final dye settles out. It is isolated and purified by dissolving in aqueous sodium chloride solution, precipitation with common salt and subsequent filtration. On drying and grinding it is obtained as a dark powder which dissolves in water with a brown colour and dyes wool, silk, leather and polyamide fibres in brown shades of excellent fastness to light, washing, milling and perspiration.

EXAMPLE 3

A mixture of 9.2 parts of the monoazo compound obtained by coupling diazotized 1-amino-2-hydroxy-6-bromonaphthalene-4-sulphonic acid with 2-hydroxynaphthalene, 6.4 parts of the monoazo compound obtained by coupling diazotized 1-aminobenzene-2-carboxylic acid with 1-phenyl-3-methyl-5-pyrazolone, 50 parts of chromic ammonium sulphate [$NH_4Cr(SO_4)_2.12H_2O$] and 100 parts of formamide is held at 110° for a few hours until the metal-free starting compounds are no longer indicated. The reaction mixture is diluted with 300 parts of water and 60 parts of sodium chloride, on which the product settles out with a dark colour. It is filtered off and purified by dissolving in water with the aid of sodium chloride solution, precipitation with common salt and filtration. On drying and grinding, a dark powder is obtained which dissolves in water with an olive-green colour and dyes wool, silk, leather and polyamide fibres in olive-green shades of excellent fastness to light, water, milling and perspiration.

EXAMPLE 4

A mixture of 23 parts of the monoazo compound obtained by coupling diazotized 2-amino-4-chloro-1-hydroxy-5-nitrobenzene with 2-hydroxy-6-chloronaphthalene-4-sulphonic acid, 7.5 parts of the monoazo compound obtained by coupling diazotized 2-amino-1-hydroxy-4-chlorobenzene with 2-hydroxynaphthalene and 11 parts of the monoazo compound obtained by coupling diazotized 2-amino-1-hydroxy-4-chlorobenzene with 7'-hydroxynaphthyl-1'-carbamic acid ethylglycol ester is stired into 250 parts of formamide and heated to 120°. After the addition of 26 parts of chromic ammonium sulphate [$NH_4Ca(SO_4)_2 \cdot 12H_2O$], this temperature is maintained for a few hours until the metal-free starting compounds are no longer indicated. The mixture is diluted with 1000 parts of water and then some sodium chloride is added, causing the hetergeneous metal complex dye to precipitate. It is isolated and purified by dissolving in warm water containing sodium hydroxide solution, precipitation with sodium chloride and filtration. It is then dried and ground to give a dark powder which dissolves in water with a blue colour and dyes wool, silk, leather and polyamide fibres in blue shades of good fastness to light, washing, milling and perspiration.

In the following table details are given of the structural composition of further heterogeneous metal complex compounds. In column A the structural composition of the monoazo compound of Formula I is listed, in column B the structural composition of some azo compounds of Formula II which are suitable for the formation of metal complex compounds, in column C the metal used for metal complex formation and in column D the shade of the dyeing on wool.

TABLE

| Ex. No. | Monoazo dyestuff of Formula I (A) | Number mols of dyes in column A | Monoazo dyestuff of Formula II (B) | Number mols of dyes in column B | Metal (C) | Shade of dyeing on wool (D) |
|---|---|---|---|---|---|---|
| 5 | 1-amino-2-hydroxy-6-bromonaphthalene-4-sulphonic acid→2-hydroxynaphthalene. | 1 | 2-amino-1-hydroxy-4-chlorobenzene→2-hydroxynapthhalene. | 1 | Cr / Co | Violet-blue. / Bordeaux. |
| 6 | do | 1 | 2-amino-1-hydroxy-5-nitrobenzene→2-hydroxynaphthalene. | 1 | Cr / Co | Blue-green. / Blue-violet. |
| 7 | do | 1.4 | 2-amino-1-hydroxy-4-nitrobenzene→acetoacetylaminobenzene. | 0.6 | Cr | Brown-olive. |
| 8 | 1-amino-2-hydroxy-6-bromonaphthalene-4-sulphonic acid→1-hydroxynaphthalene. | 0.9 | 2-amino-1-hydroxy-4-chloro-5-nitrobenzene→2-phenylaminonaphthalene. | 1.1 | Co | Blue. |
| 9 | do | 1 | 2-aminobenzene-1-carboxylic acid→2-hydroxynaphthalene. | 1 | Cr | Grey. |
| 10 | 1-amino-2-hydroxy-6-chloronaphthalene-4-sulphonic acid→2-hydroxynaphthalene. | 1 | 2-amino-1-hydroxy-5-nitrobenzene→2-aminonaphthalene. | 1 | Co | Blue. |
| 11 | do | 1 | 2-amino-1-hydroxy-4,6-dinitrobenzene→1-hydroxy-4-tert. butylbenzene. | 1 | Cr | Grey. |
| 12 | 1-amino-2-hydroxy-6-bromonaphthalene-4-sulphonic acid→1-phenyl-3-methyl-5-pyrazolone. | 1.2 | 2-amino-1-hydroxy-4-chlorobenzene→2-hydroxynaphthalene. | 0.8 | Co | Bordeaux. |
| 13 | 1-amino-2-hydroxy-6-bromonaphthalene-4-sulphonic acid→acetoacetylaminobenzene. | 1 | do | 1 | Co | Red. |
| 14 | 1-amino-2-hydroxy-6-bromonaphthalene-4-sulphonic acid→2-phenylaminonaphthalene. | 1 | 2-amino-1-hydroxy-4-nitrobenzene→1-phenyl-3-methyl-5-pyrazolone. | 1 | Co | Brown. |
| 15 | 1-amino-2-methoxy-6-bromonaphthalene-4-sulphonic acid→1-hydroxynaphthalene. | 1 | 2-amino-1-hydroxy-4-nitrobenzene→2-acetylamino-4-methyl-1-phenol. | 1 | Cr | Dark blue. |
| 16 | 1-amino-2-hydroxy-6-bromonaphthalene-4-sulphonic acid→1-hydroxy-3-methoxybenzene. | 1 | 1-aminobenzene-2-carboxylic acid→1-(3'-chlorophenyl)-3-methyl-5-pyrazolone. | 1 | Cr | Olive. |
| 17 | 1-amino-2-hydroxy-6-bromonaphthalene-4-sulphonic acid→1-phenyl-3-methyl-5-aminopyrazole. | 1 | 2-amino-1-hydroxy-4-nitrobenzene→1-acetoacetylamino-2-ethylhexane. | 1 | Cr | Red-orange. |
| 18 | 1-amino-2-hydroxy-6-bromonaphthalene-4-sulphonic acid→2-hydroxynaphthalene. | 1.2 | 1-amino-2,5-dimethoxybenzene→2-hydroxynaphthalene. | 0.8 | Cr | Blue. |
| 19 | 1-amino-2-hydroxy-6-bromonaphthalene-4-sulphonic acid→2-hydroxynaphthalene. | 0.6 | 2-amino-1-hydroxy-5-nitrobenzene→2-aminonaphthalene-6-sulphonic acid-(2'-hydroxy)-propylamide. | 1.4 | Co | Do. |
| 20 | 1-amino-2-hydroxy-6-chloronaphthalene-4-sulphonic acid→2-hydroxynaphthalene. | 1 | 2-amino-1-hydroxy-4,6-dichlorobenzene→1-hydroxy-3-methoxybenzene. | 1 | Co | Violet. |
| 21 | 1-amino-2-hydroxy-6-bromonaphthalene-4-sulphonic acid→2-hydroxynaphthalene. | 1.3 | 2-amino-1-hydroxy-5-nitrobenzene→2-methylaminonaphthalene. | 0.7 | Cr | Blue. |
| 22 | do | 1 | 2-amino-1-hydroxy-5-nitrobenzene→barbituric acid. | 1 | Cr | Violet. |
| 23 | do | 1 | 2-amino-1-hydroxy-4-nitrobenzene→3-methyl-1-phenyl-5-pyrazolone and 1-aminobenzene-2-carboxylic acid→3-methyl-1-phenyl-5-pyrazolone. | 0.5 / 0.5 | Cr | Brown-olive. / Do. |
| 24 | do | 1.1 | 2-amino-1-hydroxy-4-chlorobenzene→1-acetylamino-7-hydroxynaphthalene. | 0.9 | Cr | Blue. |
| 25 | do | 1 | 2-amino-4,6-dinitro-1-hydroxybenzene→2-2-hydroxynaphthalene. | 1 | Cr | Black. |
| 26 | do | 1 | 2-amino-6-chloro-1-hydroxy-4-nitrobenzene→2-hydroxynaphthalene. | 1 | Cr | Do. |
| 27 | do | 1 | 2-amino-4,6-dinitro-1-hydroxybenzene→3-methyl-1-phenyl-5-pyrazolone and 1-aminobenzene-2-carboxylic acid→3-methyl-1-phenyl-5-pyrazolone. | 0.5 / 0.5 | Cr | Olive. / Do. |
| 28 | do | 1 | 2-amino-4,6-dinitro-1-hydroxybenzene→3-methyl-1-phenyl-5-pyrazolone and 2-amino-1-hydroxy-4-nitrobenzene→acetoacetylaminobenzene. | 0.5 / 0.5 | Cr | Do. |
| 29 | 1-amino-2-hydroxy-6-bromonaphthalene-4-sulphonic acid→acetoacetylaminobenzene. | 1 | 2-amino-1-hydroxy-4-nitrobenzene→2-hydroxynaphthalene. | 1 | Cr | Violet. |
| 30 | do | 0.9 | 2-amino-1-hydroxy-4-chlorobenzene→2-phenylaminonaphthalene. | 1.1 | Co | Do. |
| 31 | 1-amino-2-hydroxy-6-bromonaphthalene-4-sulphonic acid→1,3-diaminobenzene. | 1 | 2-amino-1-hydroxy-5-nitrobenzene→1-phenyl-3-methyl-5-amino-pyrazole. | 1 | Co | Brown. |
| 32 | 2-amino-1-hydroxy-4,6-dichlorobenzene→2-hydroxy-6-chloronaphthalene-4-sulphonic acid. | 1 | 2-amino-1-hydroxy-4-chlorobenzene→2-hydrosyethylaminonaphthalene. | 1 | Co | Violet. |
| 33 | 2-amino-1-hydroxy-5-nitro-benzene→2-hydroxy-6-chloronaphthalene-4-sulphonic acid. | 1 | 1-aminobenzene-2-carboxylic acid→3-methyl-1-phenyl-5-pyrazolone-3'-sulphonic acid amide. | 1 | Cr | Green. |
| 34 | 1-amino-2-hydroxy-6-bromonaphthalene-4-sulphonic acid→2-hydroxynaphthalene. | 1 | 2-amino-1-hydroxy-4-nitrobenzene→2-hydroxynaphthalene. | 1 | Cr | Black. |

Application Example A

One part of the dye obtained in accordance with Example 1 is dissolved in 4000 parts of water at 40–50°. 100 parts of previously wetted wool are entered into solution, after which 2 parts of acetic acid are dropped in. The dyebath is raised to 100° in 30 minutes and held at this temperature for 1 hour. The dyed wool is then removed, rinsed with water and dried. A brown dyeing of excellent fastness to light, washing, milling and perspiration is obtained.

A dyeing with the same properties is obtained when the wool is replaced by 100 parts of nylon.

Application Example B 100 parts of secondary cellulose acetate containing 54–55% splittable acetic acid are entered into 300 parts of a solvent, for example a mixture of 275 parts of acetone and 25 parts of methanol. The solution is stirred and left overnight to swell. One part of the dye obtained in Example 1 is dissolved in 60 parts of the same solvent and added to the cellulose acetate solution. This is then stirred until 60 parts of solvent have evaporated. It is filtered through cotton and a filter press and spun in the same way as undyed acetate to give brown filaments.

Application Example C

A lacquer medium is prepared with 20 parts of "Vinylite VMCH," 70 parts of methyl ethyl ketone and 10 parts of ethylene glycol. 0.5 part of the cobalt-containing dye obtained in Example 1 are stirred into 10 parts of this solution, which is subsequently diluted with 25 parts of a 1:1 mixture of methyl ethyl ketone and cyclohexanone. The coloured lacquer is coated on aluminum and air dried. The brown coating shows good adhesability and has good fastness to light, wet rubbing, fats and to finishing.

Formulae of representative dyes of the foregoing examples are as follows:

*Example 2.*—The 1:2 chromum mixed complex of 1 mol of the azo compound of the formula:

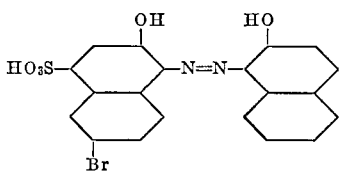

and 1 mol of the azo compound of the formula:

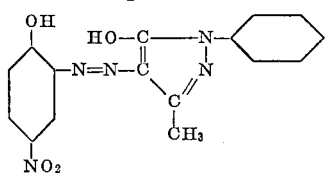

*Example 7.*—The 1:2 chromium mixed complex of 1.4 mol of the azo compound of the formula:

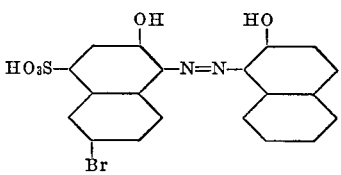

and 0.6 mol of the azo compound of the formula:

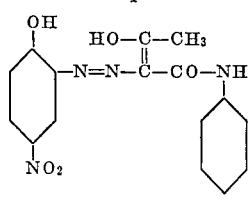

*Example 23.*—The 1:2 chromium mixed complex of 1 mol of the azo compound of the formula:

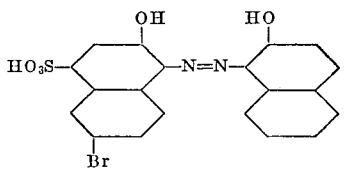

and a mixture of 0.5 mol of the azo compound of the formula:

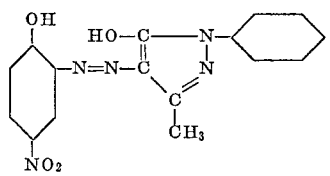

and 0.5 mol of the azo compound of the formula:

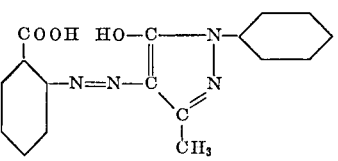

*Example 24.*—The 1:2 chromium mixed complex of 1.1 mol of the azo compound of the formula:

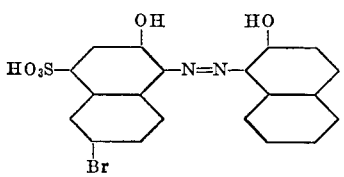

and 0.9 mol of the azo compound of the formula:

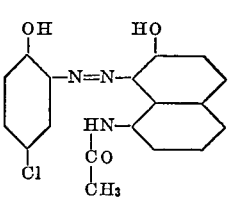

*Example 34.*—The 1:2 chromium mixed complex of 1 mol of the azo compound of the formula:

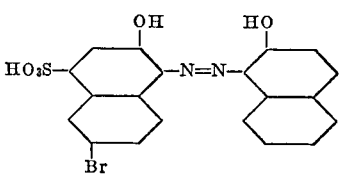

and 1 mol of the azo compound of the formula:

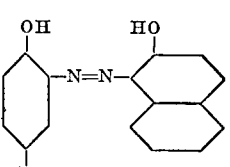

Having thus disclosed the invention what we claim is:
1. Heterogeneous 1:2 metal:dye complex of one equivalent of a metal selected from the group consisting of cobalt and chromium and two moles of a mixture of monoazo dyes, each of which is capable of metal complex formation, one of the dyes of the mixture being of the formula:

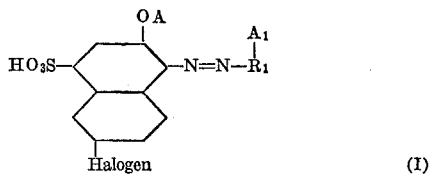

wherein:
A is a member selected from the group consisting of a hydrogen atom and lower alkyl;
Halogen is a member selected from the group consisting of chloro and bromo;
$R_1$ is a member selected from the group consisting of unsubstituted naphthalene bound by its 1-position to an azo nitrogen, 1-phenyl-3-methyl-5-pyrazolyl, 1-methylethene-2-carbanilide bound by its 2-position to an azo nitrogen and benzene, any substituent of which is a member selected from the group consisting of methoxy, amino, chloro and nitro;
$A_1$ is bound to $R_1$ ortho to the azo group and is a member selected from the group consisting of hydroxy, amino, phenylamino and lower alkoxy;
and the other dye or dyes of the mixture being of the formula:

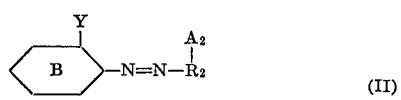

wherein:
Y is a member selected from the group consisting of hydroxy, carboxy and lower alkoxy;
$R_2$ is a member selected from the group consisting of (a) naphthalene, any substituent of which is a member selected from the group consisting of acetylamino, sulfonic acid (2'-hydroxy)propylamide and hydroxyethyl, (b) 1-phenyl-3-methyl-5-pyrazolyl, any substituent on the phenyl of which being a member selected from the group consisting of chloro and sulfonic acid amide, (c) benzene, any substituent of which is a member selected from the group consisting of butyl, methoxy, methyl, acetylamino and ethylideneacetylamino, (d) 1-methyl-2-(2'-ethylhexylaminocarbonyl) ethene bound at the 2-position to an azo nitrogen and (e) 2,4-dioxotetrahydropyrimidyl bound at the 5-position to an azo nitrogen;
$A_2$ is bound to $R_2$ ortho to the azo group and is a member selected from the group consisting of hydroxy, amino, methylamino, phenylamino and lower alkoxy; and
any substituent on ring B is a member selected from the group consisting of chloro, nitro and methoxy.

2. Metal:dye complex according to claim 1 wherein $R_1$ is a member selected from the group consisting of unsubstituted naphthalene, 1-phenyl-3-methyl-5-pyrazolyl, 3-methoxy benzene and 3-aminobenzene; $A_1$ is a member selected from the group consisting of hydroxy, amino and phenylamino; Y is a member selected from the group consisting of hydroxy, carboxy and methoxy; $A_2$ is a member selected from the group consisting of hydroxy, amino, methylamino and phenylamino; $R_2$ is a member selected from the group consisting of unsubstituted naphthalene, acetylaminonaphthalene, naphthalene-sulfonic acid-(2'-hydroxy)propylamide, hydroxyethylnaphthalene, 1-phenyl-3-methyl-5-pyrazolyl, 1-(3'-chlorophenyl)-3-methyl-5-pyrazolyl, tert. butylbenzene, methoxybenzene, acetylamino-methyl-benzene, ethylideneacetylamino-benzene, ethylideneacetylamino-(2-ethyl)hexane and 2,4-dioxotetrahydropyrimidyl; any substitution on ring B being selected from the group consisting of chloro, dichloro, nitro, dinitro and methoxy.

3. Heterogeneous 1:2 metal:dye complex according to claim 1 wherein each azo nitrogen atom of the monoazo dye of Formula I is directly bound to the 1-position of a naphthalene ring.

4. Water-soluble metal:dye complex according to claim 3 of the formula:

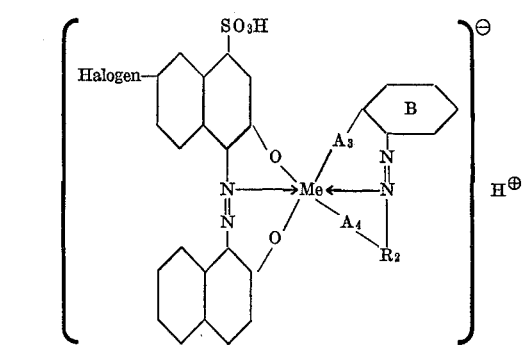

wherein:
$A_3$ is a member selected from the group consisting of —O— and —COO—;
$A_4$ is a member selected from the group consisting of —O—, —NH—, —N(methyl)— and —N(phenyl)—; and
Me is a metal selected from the group consisting of chromium and cobalt.

5. A 1:2 metal:dye complex according to claim 1 wherein the molar ratio of dye of Formula I to dye of Formula II is 1:1 and the metal is chromium.

6. The 1:2 chromium mixed complex according to claim 1 of 1 mol of the azo compound of the formula:

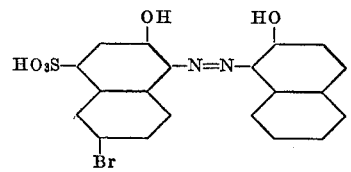

and 1 mol of the azo compound of the formula:

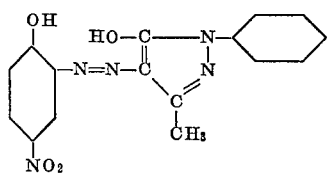

7. The 1:2 chromium mixed complex according to claim 1 of 1.4 mol of the azo compound of the formula:

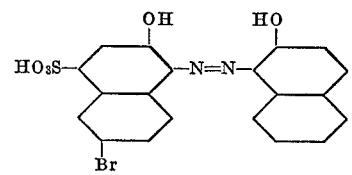

and 0.6 mol of the azo compound of the formula:

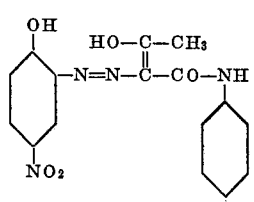

8. The 1:2 chromium mixed complex according to claim 1 of 1 mol of the azo compound of the formula:

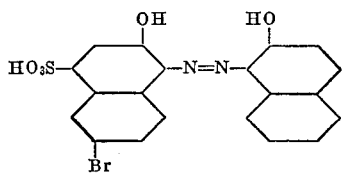

and a mixture of 0.5 mol of the azo compound of the formula:

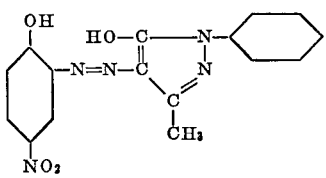

and 0.5 mol of the azo compound of the formula:

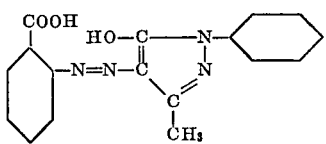

9. The 1:2 chromium mixed complex according to claim 1 of 1.1 mol of the azo compound of the formula:

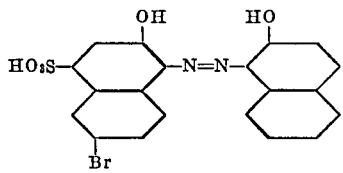

and 0.9 mol of the azo compound of the formula:

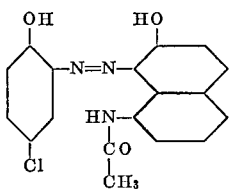

10. The 1:2 chromium mixed complex according to claim 1 of 1 mol of the azo compound of the formula:

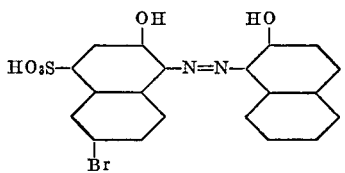

and 1 mol of the azo compound of the formula:

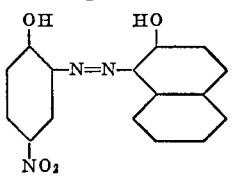

References Cited

UNITED STATES PATENTS 1,984,096  12/1934  Straub et al. _____ 260—145 X

FLOYD DALE HIGEL, Primary Examiner

U.S. Cl. X.R.

8—4, 13, 42, 43, 71; 117—138.8, 142, 143; 260—37, 150, 163, 195, 200